United States Patent [19]

Ehret et al.

[11] 4,313,280
[45] Feb. 2, 1982

[54] QUICK OPENING LATCH ARRANGEMENT FOR HINGED VEHICLE WINDOWS

[75] Inventors: Yale W. Ehret, Elkhart, Ind.; Gerald C. Kasner, Union, Mich.

[73] Assignee: The Adams & Westlake Company, Elkhart, Ind.

[21] Appl. No.: 138,912

[22] Filed: Apr. 10, 1980

[51] Int. Cl.³ .............................................. E05B 65/10
[52] U.S. Cl. ....................................... 49/141; 49/394; 292/87; 292/DIG. 33
[58] Field of Search .................. 49/141, 394, 276, 278; 292/80, 87, 88, 89, 209, DIG. 33

[56] References Cited

U.S. PATENT DOCUMENTS

| | | | |
|---|---|---|---|
| 2,830,843 | 4/1958 | Seaburg et al. | 49/141 X |
| 3,913,265 | 10/1975 | Ehret et al. | 49/141 |
| 3,942,286 | 3/1976 | Ehret et al. | 49/141 |

Primary Examiner—Philip C. Kannan

Attorney, Agent, or Firm—McWilliams, Mann & Zummer

[57] ABSTRACT

A quick opening latch arrangement for hinged vehicle windows in which the window opening that is defined by the vehicle side wall has a sash frame assembly hinged to the window framing at the top of the window opening, and the sash frame assembly along its lower rail is equipped with a latch and release bar hinged thereto for cooperation with a keeper bar in parallelism therewith that is adjustably mounted on the window frame sash subframe. The keeper bar is formed with an elongate bead of cylindrical configuration that is snap fitted in a similarly contoured socket formed in the latch and release bar, to latch the sash frame assembly in its closed position, with the latch assembly being arranged to effectively resist opening under pressures acting outwardly of the window and the sash assembly, while providing for quick release of the latch under a light manually applied pulling action on the latch and release bar.

10 Claims, 7 Drawing Figures

QUICK OPENING LATCH ARRANGEMENT FOR HINGED VEHICLE WINDOWS

This invention relates to a hinged window construction, and more particularly, to a quick opening latch arrangement for hinged vehicle windows that are normally closed in use, but which are to involve or provide for quick opening of the sash assembly outwardly of the vehicle under emergency conditions.

Window construction planning for passenger vehicles, such as buses and railroad passenger cars including mass transit cars usually provide for several of the sash assemblies to be releasably mounted for quick opening with minimum effort and loss of time in emergencies. Typically the window construction involved for such openable windows includes a sash assembly hinged to the window frame at the top of the window, and a latch and release mechanism for normally holding the sash assembly in its sealed, closed tight position, but arranged to provide for quick release or unlocking of the sash assembly and opening of same outwardly of the window, in emergencies, such as might require passengers to leave the vehicle by way of the window. One such arrangement is disclosed in Ehret and Frey U.S. Pat. No. 3,942,286, granted Mar. 9, 1976, and assigned to the assignee of the instant application.

Current test specifications for evaluating window constructions of this type used in buses and similar public transportation vehicles place large emphasis on the latch and release mechanism for the openable sash assembly resisting release against substantial forces on the sash assembly acting outwardly of the window, while calling for light passenger applied pressure or pull effort on the latch and release mechanism for quick release and opening of the sash assembly in emergencies. Thus, while the sash assembly latching device is to release under, for instance, a pull of twenty pounds or less on the latch and release bar, the latch assembly must also resist release, under forces acting on the sash assembly outwardly of the window, up to twelve hundred pounds and centered in an outward direction.

While arranging the latch assembly and related window components to resist substantial forces acting outwardly of the window heretofore has been readily provided for as such, the low release force quick opening requirement seemingly has brought together, as design parameters for window constructions of the type indicated, two basically a consistent and opposed criteria that have been found to not be satisfied by conventional approaches to the problem. Furthermore, window constructions of this type commonly involve sealing gaskets or the ike for sealing out the elements and temperature comfort purposes which tend to take a "set" as they age. As window constructions of the type indicated normally involve seals of this type being compression stressed when the window is latched closed, the aging of the seals can adversely affect the ability of the sash assembly latch arrangement to continue to offer a high level of resistance to forces acting on the window sash, even though the ability of the sash assembly latching arrangement to resist unintended release and opening is just as important after the vehicle has been in use for some years when it is when the vehicle is new.

A principal object of the present invention is to provide an openable window construction for vehicles or the like in which the sash assembly is to be openable as a whole and be latched in place by a latching arrangement offering maximum resistance to release against outwardly directed forces acting on the sash assembly, while permitting quick release of the latch device involved with minimum but deliberately applied pulling effort on the latch itself being required.

Another principal object of the invention is to provide, in a window construction involving a sash assembly that is to be openable as a whole under emergency conditions by swinging movement outwardly of the window, a sash assembly latch and release device at the horizontal latch and release bar type in which the latch and release bar and the keeper associated therewith are structurally coordinated and related to remain in latched or locking relation against sudden and undue forces acting on the sash assembly outwardly of the window, but which are simply, smoothly, and readily released under low pull forces and applied to the latch and release bar when needed for emergency purposes.

Yet another important object of the invention is to provide a mounting arrangement for window construction sash assembly latch and release devices of the type indicated which insures that the proper coordination and location of the latch and release bar and its keeper that will provide the aforementioned characteristics of firm resistance to pressures acting on the sash assembly directed outwardly of the window, deliberately or otherwise, while permitting quick and easy intentional release, and also providing for time to time adjustment of the device to maintain these characteristics as the seals involved in the sash assembly in question age in use.

Other objects of the invention are to provide a latch and release bar type latching arrangement for swingably mounted sash assembly type vehicle window constructions in which the latch and release bar is shaped and contoured to, when the latch device looks the sash assembly in its closed relation, both mask the latch and release bar keeper and coordinate aesthetically with fixed trim of adjacent fixture non-openable window constructions, as well as provide a readily accessible hand grip for crank or swing actuating the latch and release bar for quick release purposes, and in addition, define air flow apertures that are disposed along the sash assembly serviced by the latch device and form part of a heat flow path for directing warming air from the ducting underlying same over the inner surface of the window glass.

Yet other objects of the invention are to provide a latch and release bar type latching arrangement for vehicle window constructions and the mounting arrangement therefor that are economical of manufacture, convenient to install, and long lived in use.

In accordance with the invention, a hinged window construction is provided in which the window opening is of generally quadrilateral outline that is defined by the side wall of the vehicle or the like, with the window framing being in the form of stationary sash subframing of a composite type defining an upper, a lower, and spaced side frame portions of a resiliently compressible type and being in the nature of clamping components, the outer side portions of which are equipped with appropriate gasketing, with the subframing components being screw clamped against the inner and outer sides of the side wall about the window opening to define the opening in which the sash assembly is hingedly mounted.

The sash assembly has a hinge connection with the upper sash subframe member for swinging movement out of the plane of the window opening.

The sash assembly comprises a sash frame including upper and lower rail portions and spaced side rail portions between which a conventional sash pane or panes are mounted in any conventional manner. The sash frame assembly along its lower rail is equipped with an elongate latch and release bar leaf hinged thereto for cooperation with a shorter keeper bar that is centered thereon and with respect to the window sash assembly and that is adjustably mounted on the sash subframe. The keeper bar is formed with an elongate bead of cylindrical configuration that surmounts an upwardly and inwardly angled thrust flange integral with the keeper bar. The underside of the latch and release bar is formed with a semi-cylindrically contoured socket of the same radius as that of the keeper bar bead the upper side of which is in substantial tangent coplanar relation with the pivot axis of the latch and release bar hinge pivot axis, and the lower edge of which forms a snap acting corner to which leads a planar, diagonal cam surface formed on the outwardly facing side of a depending rib of a latch and release bar that extends longitudinally thereof. The hinging pivot axis of the latch and release bar and the central axis of the keeper bead are at a predetermined distance from each other and are level related such that when the latch and release bar socket receives the keeper bead, the actual centers of the latch bar socket and bead are aligned and are at a level below the level of the hinging axis, with the latch bar snap action corner underlying the keeper bead but extending short of the lowermost surfacing of same.

The result is that the sash assembly firmly resists outwardly acting forces applied thereto by way of the latch bar socket bearing against the keeper bead, with the keeper bead being held in centered relation to the latch bar socket under the stresses involved.

However, when the sash assembly is to be released and opened, one applies a light pulling action on the latch and release bar, which is equipped with a vertical hand hold portion for that purpose, whereby the snap action corner cams itself free of the keeper bead and the window may be readily swung to open position. The sash assembly is readily re-locked in closed position by swinging the sash assembly back to its closed position, by appropriately grasping the handle portion of the latch and release bar, and camming its depending rib cam surface over the keeper bead to snap fit the keeper bead into the latch and release bar socket.

The invention contemplates that the keeper bar is adjustably mounted to permit changing of its position from time to time, as "set" may develop in the gasket members employed in the sash assembly and sash subframe therefor, to maintain the proper relationship of the keeper bead relative to the latch and release bar hinging axis that provides the orientation of parts that achieves the benefits of the present invention.

Further in accordance with the invention, the latch and release bar that is specifically herein disclosed is arranged for application to vehicles on which window constructions of the hingedly mounted sash assembly type are staggered along the length of the vehicle to be located at a predetermined spacing relative to fixed window sash constructions, as, for instance, in alternating relation to fixed window constructions. The latch and release bar of the invention extends the major portion of the hingedly mounted sash assembly and is shaped to conform with fixed window still trim that extends along the windows of fixed sash construction into adjacency with the latch bar. The latch bar is also arranged for cooperation with the heating ducting that is conventionally disposed in buses and the like along the side wall of the vehicle underneath the windows to permit heated air to rise through apertures formed in the latch bar and pass across the sash assembly involved.

Other objects, uses and advantages will be obvious or become apparent from a consideration of the following detailed description and the application drawings in which like reference numerals indicate like parts throughout the several views.

In the drawings:

FIG. 1 is a diagrammatic fragmental perspective view illustrating a fragment of a side wall of a vehicle that is equipped with the sash assembly hinged for opening and equipped for latching and release in accordance with the present invention, intermediate two fixed sash assemblies, also diagrammatically illustrating the fixed window sill trim members that are applied to the two fixed window assemblies and the coordination of the latch and release bar of the illustrated embodiment of the present invention with respect thereto;

Figure 2:
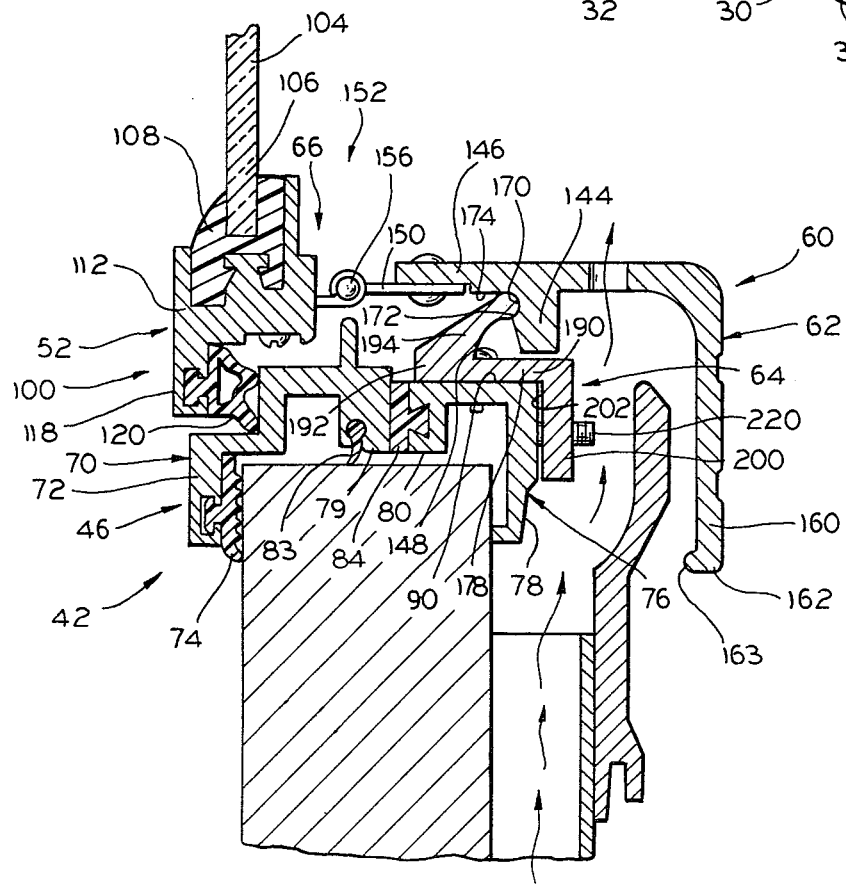
FIG. 2 is a diagrammatic transverse cross-sectional view through the openable sash assembly of FIG. 1, taken substantially along line 2—2 of FIG. 1 and illustrating on an enlarged scale the sash assembly lower rail, the stationary sash lower subframe arrangement associated therewith, and the latch and release bar and keeper bar forming the latching arrangement of the present invention.
Figure 6:
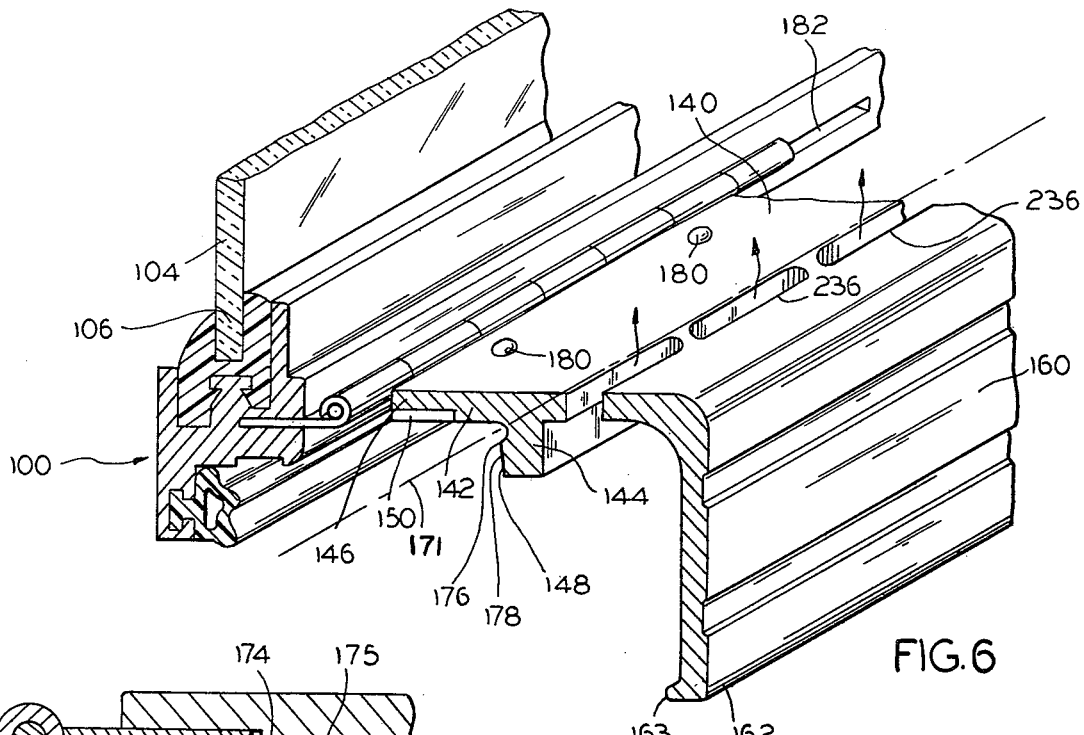
Figure 7:
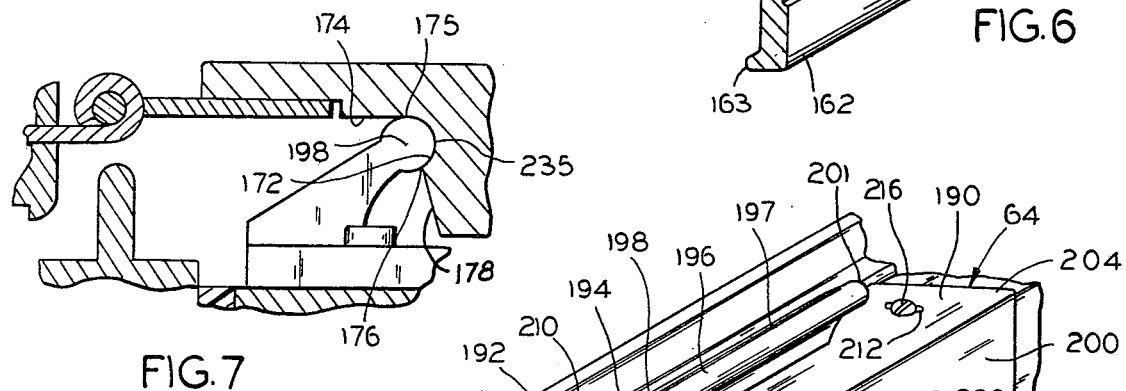

FIG. 6 is a fragmental perspective view of the sash assembly lower rail and the latch and release bar connected thereto, illustrating the manner of hingedly connecting the latch and release bar to the sash assembly in accordance with the present invention; and FIG. 7 is a sectional view similar to that of FIG. 2, but showing on a further enlarged scale the relation between the latching bead, socket therefor, and hinging axis of basic components of the latching device.

However, it is to be distinctly understood that the specific drawing illustrations provided are supplied primarily to comply with the requirements of the Patent Laws, and that the invention is susceptible to modifications and variations that will be obvious to those skilled in the art, and which are intended to be covered by the appended claims.

Figure 1:
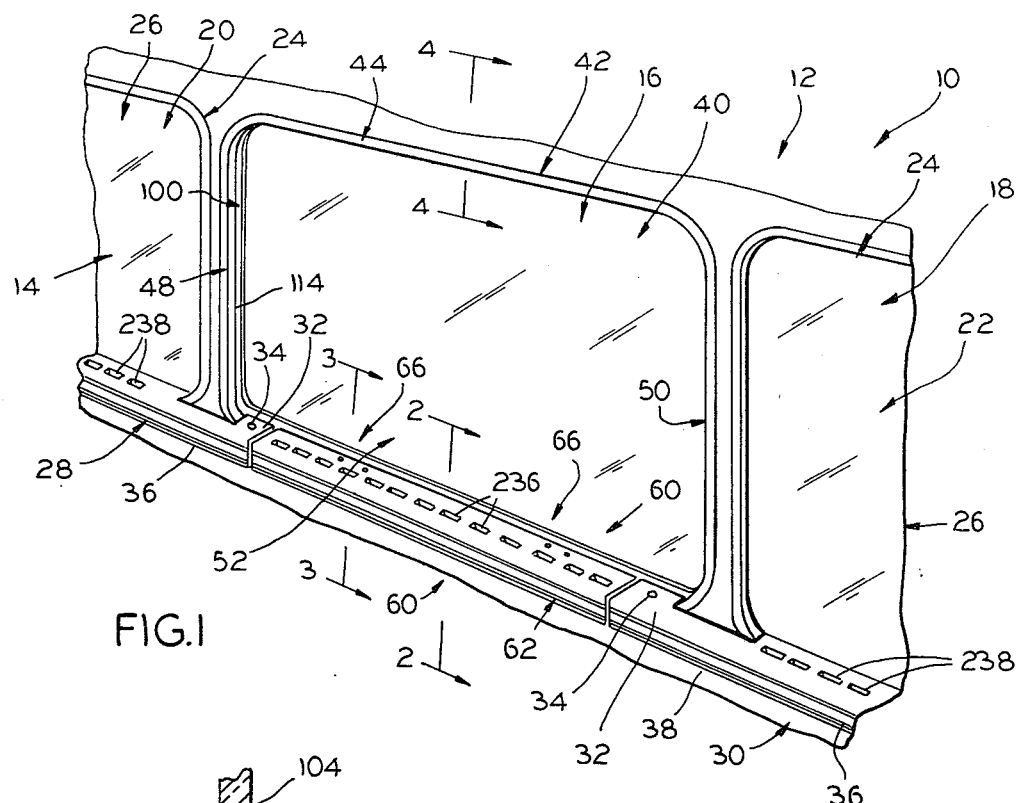

Reference numeral 10 of FIG. 1 generally indicates the side wall of a vehicle 12 that is shaped to define a plurality of consecutive window openings 14, 16 and 18. The vehicle 12 may be a bus, railroad passenger car, or other mass transit vehicle in which the side wall 10 is formed by any suitable framing that is block diagram illustrated for simplicity and which is shaped in any suitable manner to define the respective window openings 14, 16 and 18.

In the diagrammatic illustration provided in FIG. 1, window openings 14 and 18 are closed by fixed window sash assemblies 20 and 22 of any conventional nature, which include suitable window framing indicated at 24 which suitably mounts the respective fixed glass panes 26. As is conventional, the fixed window assemblies 20 and 22 have mounted along the base of the respective window openings 14 and 18 the respective trim members 28 and 30 that form the sills of the respective window assemblies 20 and 22 and extend to the window opening 16 on either side of same, with terminal end portions 32 being fixed to the vehicle framing involved in any suitable manner, as by employing suitable screws 34. The trim members 28 and 30 are conventionally slotted as at 36 to permit the passage of warm air emitting from warm air ducts of conventionally applied below the trim members 28 and 30 to rise across the respective sash assemblies 20 and 22. The trim members 28 and 30 include depending flange portions 36 which extend downwardly to partially overlie continuous side trim members 38 (see FIG. 5) that are applied along the side walls of the vehicle in overlying relation to warm air supplying ducts that will be referred to hereinafter.

The openable window construction 40 of the present invention is illustrated as applied to the window opening 16, and comprises sash subframe 42 applied about the margin of the window opening 16 as defined by the vehicle wall 10 and defining top or upper section 44, lower or bottom section 46 (see FIGS. 2, 3 and 5), and spaced side sections 48 and 50.

Figure 4:
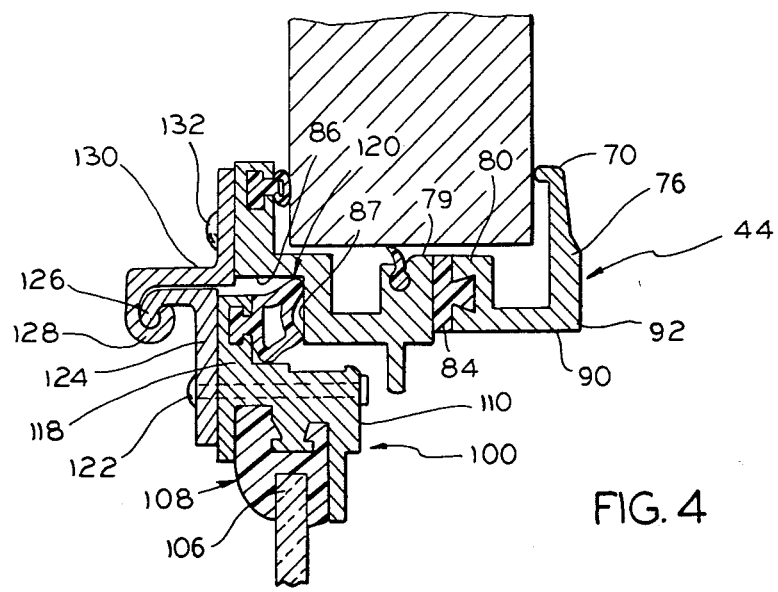
FIG. 4 is a view similar to that of FIG. 2 but taken along line 4—4 of FIG. 1, and illustrating the hinged connection employed for the openable sash assembly of FIG. 1.

The window construction 40 includes sash assembly 52 that is hingedly connected to the upper sash subframe section 44 in the manner diagrammatically illustrated in FIG. 4 for swinging movement of the sash assembly 52 between the closed position shown in FIG. 1 and an open position to the left of FIGS. 2-5 for opening of the window opening 16 as needed.

Figure 3:
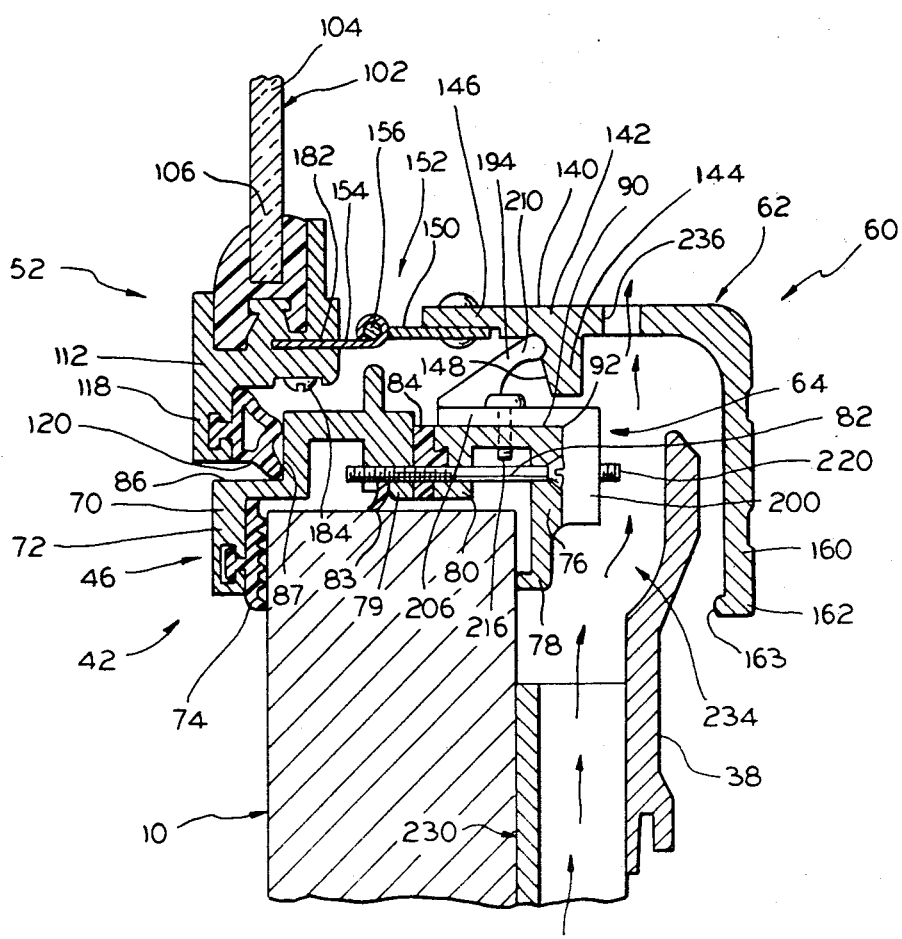
FIG. 3 is a view similar to that of FIG. 2, but taken substantially along line 3—3 of FIG. 1, in the area of one of the hinged connections of the sash assembly latch and release bar hinged connections.

The window construction 40 includes the latch and release device 60 of the present invention that comprises the elongate latch and release bar 62 that is hinged to the sash assembly 52 and keeper bar 64 that is adjustably mounted on the sash subframe lower section 46 for holding the sash assembly 52 in latched relation in the manner indicated in FIGS. 2 and 3.

As indicated in FIG. 1, the latch and release bar 62 extends a substantial portion of the length of the window opening 16, and in the form illustrated, between the terminal end portions 32 of the stationary trim members 30 in close fitting relation thereto. The latch and release bar 62 is hingedly connected to the sash assembly 52 in the two spaced apart places indicated by reference numeral 66; the keeper bar 64 is a relatively short, as compared to the length of the latch and release bar 62, and is centered along the length of the latch and release bar 62 between the hinge connections 66 and is mounted in place in the manner diagrammatically indicated in FIGS. 2, 3 and 5. The latch release bar 62 and the keeper bar 64 are structurally and positionally coordinated, in accordance with the invention, such that short of being swung counterclockwise of FIGS. 2, 3 and 6 by manual lifting action on the latch and release bar 62, the latch and release bar 62 remains anchored to the keeper bar 64 under substantial thrust forces applied to the sash assembly 52 center on and acting outwardly of the window opening 16. However, the latch and release bar 62 is shaped relative to the keeper bar 64 so that a relatively light pulling action on the latch and release bar by hand action counterclockwise of FIGS. 2, 3 and 7 will quickly release the sash assembly 42 for opening swinging movement as needed.

The general arrangement of the sash subframe 42 and sash assembly 52 is diagrammatically illustrated in the sectional views of FIGS. 2-6; while only the upper and lower sections of the sash subframe 42 and the sash assembly 52 are illustrated, the side sections of these two assemblies are similarly constructed and arranged, except, of course, for the hinged connection of the sash assembly 52 to the upper sash subframe section 44.

the sash subframe sections thus each comprise an outer clamping member (see FIGS. 2, 3 and 5) 70 having a clamping jaw 72 equipped with a suitable resilient sealing strip 74, and an inner jaw member 76 equipped with a clamping jaw 78. The members 70 and 76 are flanged as at 79 and 80, respectively, for threaded connection by suitable screw fastener 82 with the resiliently compressible seal strip member 84 being applied therebetween and therealong in the manner indicated in FIGS. 2-5. The threaded fasteners 82 are applied between the respective clamping members 70 and 76 at spaced points about the margin of the subframe 42 to clamp the members 70 and 76 of the subframe firmly against the margin of the vehicle side wall 10 that defines the window opening 16, and compress strip member 84 in so doing, as will be apparent to those skilled in the art. Outer clamping member flange 79 is equipped with suitable seal 83 in the illustrated embodiment.

The outer clamping member 70 is formed to define a right angled recess 86 defining planar abutment surface 87 against which the sash assembly 52 is pressed in the sealed relation indicated in FIGS. 2 and 3 by the action of the latch device 60. The clamping member 76 is formed with planar platform portion 90 that merges into jaw portion 76 at right angled corner 92 to serve, in the lower section 46 of the subframe, as the support for the keeper bar 64 that will be hereinafter described in detail.

The sash assembly 52 comprises unitary sash frame 100 which is of the type in which the window pane 102 is fixedly mounted in the frame, as distinguished from the type of sash assembly in which one or more of the panes are slidably mounted in the frame. The window pane 102 comprises plate 104 formed from glass or the like, having its marginal edges 106 suitably received in glazing seal 108 of any conventional nature that is in turn suitably mounted in the sash frame 100.

Sash frame 100 defines upper rail section 110, lower rail section 112, and side rail sections 114 (only one of which is diagrammatically illustrated in FIG. 1), which have a transverse section comparable to the sash rail section shown in FIGS. 2-4 and 6. The sash frame rail section each have a laterally projecting flange segment 118 equipped with a suitable bulb type sealing gasket 120 which is placed in sealing relation with the sash subframe recess 86, and specifically its planar wall surface 87 under the biasing action provided by the operation of latching device 60, about the perimeter of each subframe 42.

The sash assembly frame top rail portion 110 has suitably affixed thereto by fasteners 122 a conventional hinge plate 124 formed with a hinging protuberance 126 pivotally mounted in hinging socket structure 128 of conventional stationary hinge member 130 that is suitably affixed to the sash subframe upper section 44 in the manner suggested in FIG. 4, as by employing suitable fasteners 132.

Turning now more particularly to the latch device 60, the latch and release bar 62 is of generally right angled transverse cross-sectional configuration (see FIGS. 2, 3 and 6) along its length and defines a generally planar base flange portion 140 forming one side of the latch bar having a generally planar web 142 and a depending rib 144 extending the length of same along the median section of the base flange portion 140 as well as a planar terminal edge portion 146 that is coplanar with the latch bar base flange portion 140 and spaced from the side 148 of the rib 144 that faces outwardly of the window opening 16. As indicated in the drawings, the terminal edge portion 146 is of reduced thickness for application thereto of hinge leaf 150 that forms one side of hinge assembly 152, the other leaf 154 of which is pivotally connected thereto by suitable pin 156. The hinge assemblies 152 form the respective hinging devices 66, and will be described more specifically in relation to FIG. 6 as the disclosure proceeds.

The latch and release bar 62 also defines depending flange portion 160 that is at right angled relation to the base flange portion 140, with its depending side edge 162 and rounded inner rib 163 forming the hand grip for the latch and release bar 62 that extends along the length of same for ease of gripping and operation of the latch and release bar 62. The release bar side edge 162 and the rib 163 that extends longitudinally of same have limited spacing inwardly of trim member 38 to keep the user's hand well away from the latching parts of latch 60.

The latch and release bar 62 depending rib 144 along its side 148 defines a concave latching seat 170 that is of semi-cylindrical configuration that is struck on a radius about an axis 171 (see FIG. 6) that is a predetermined selected distance from the hinging axis 156 of the hinge assemblies 152. The latch bar seat 170 is defined by semi-cylindrical surfacing 172 that is tangent with the planar underside 174 of the base flange 140 at its edge 175 and arcs approximately 140 degrees, circumferentially of the seat 170, to form, along the side 148 of rib 144, snap action edge 176 which is rectilinear in nature and extends longitudinally of the latch and release bar 62. Merging into snap action edge 176 from below same is cam surface 178 on the side 148 of the rib 144, which is directed diagonally downward of the rib 144 and converges in the plane of the latch bar depending flange portion 160, in the general direction of the latch bar handle portion 162.

As already indicated, the hinging connections 66 for the latch and release bar 62 are disposed one on either side of the keeper bar 66. For each hinge assembly 152, hinge leaf 150 is affixed to the latch bar terminal edge portion 146 by suitable fasteners that may be in the form of rivets 180. The sash frame lower rail section 46 in the area of each of the hinging connections 66 is formed with elongate slots 182 extending inwardly of the lower sash rail, outwardly of the window, as indicated in FIGS. 3 and 6, with the leaf hing 154 of the respective hinge assemblies 152 being proportioned to be inserted in the respective slots 182 in close fitting relation thereto and secured therein by applying a suitable screw fastener 184 (see FIG. 3) or the like thereto through the underside of the sash assembly lower sash rail portion 112, as suggested by the showing of FIG. 3.

It is to be noted that the hinge leaves 150 and 154 of the hinging devices 152 are in parallel relation in the latched relation of latch device 60, and that the hinging axis 156 of the hinging connections 152 is at a level above the central axis 171 of the latch bar seat 170, in the latched relation of device 60.

The keeper bar 64 comprises a base flange portion 190 that forms one side of the keeper bar and that is seated on the platform surface 90 of the sash subframe lower section clamp member 76, so as to be below the latch bar seat 170 in the latched position of the latch device 60. Keeper bar base flange portion 190 has along its outer marginal side portion 192 an upwardly angled thrust flange 194 that angles upwardly and inwardly of the window opening 16 at an acute angle of approximately thirty degrees and which is surmounted with a horizontally disposed rectilinear bead 196 of cylindrical configuration that is struck on a radius about central axis 198 that is complementary to that of semi-cylindrical surfacing 172 of latch bar seat 170. The cylindrically contoured surfacing 197 of bead 196 approximates two hundred seventy degrees in circumference.

The angle thrust flange 194 extends longitudinally of the keeper bar 64, and keeper bar 64 is to be adjustably mounted on the sash subframe lower section 46 to be in parallelism with the latch and release bar 62 and specifically its seat 170, so that the bead 196 and socket or seat 170 will be in proper interfittable relation.

Keeper bar 64 also includes integral with base flange portion 190 a depending flange portion 200 integral therewith, which together with the base flange portion 190 defines a right angled mounting socket 202 for ease of application of the keeper bar 64 to clamping member 76 of the lower sash subframe section 46.

Figure 5:
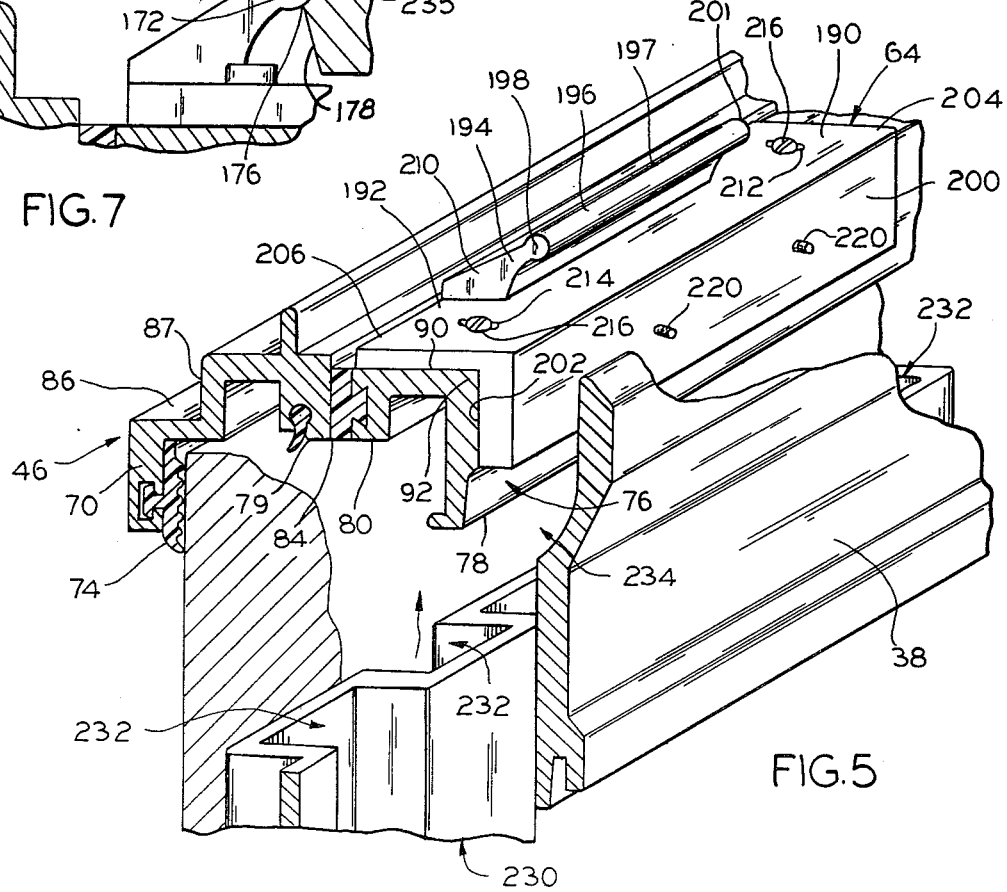
FIG. 5 is a diagrammatic fragmental perspective view of the sash assembly lower subframe and associated parts, illustrating the adjustable mounting arrangement of the keeper bar shown in FIG. 2.

As indicated in FIG. 5, the keeper bar 64 has oppositely extending end portions 204 and 206 that extend beyond the ends 208 and 210 of the thrust flange 194 and its bead 196. The keeper bar end portions 204 and 206 are formed with the respective elongate slots 212 and 214 (see FIG. 5) each of which receives a mounting clamp screw 216 that are each threadedly received in the sash subframe clamping member 76, of the lower sash frame section 46, to anchor the keeper member to the sash subframe.

It is critical to this invention that the keeper bar 64 be mounted relative to the latch and release bar 62 such that the axial center 198 of the keeper bead 196 will be aligned with the axial center 171 of latch bar seat 170 in the latched relation of latch device 60. For this purpose, the latch bar slots 212 and 214 are elongate transversely of the keeper bar 64, and the keeper bar flange 200 is equipped with a pair of spaced apart set screws 220 that may be turned against the clamping member 76 of the sash lower subframe section 46 as needed to bring the axial center 198 into alignment with the latch bar seat actual center 171 in the latched relation of device 60. For adjusting purposes, keeper bar flange 200 should be spaced from sash subframe jaw 76 when the parts are positioned so that axes 171 and 198 are aligned.

In this connection, in the assembled relation of the sash subframe sections, the screw fasteners 82 will compress resilient sealing member 84 sufficiently so that insofar as the sash subframe lower section 46 is concerned, the keeper bar depending flange 200 will normally be spaced somewhat from clamping member 76 in the operative relation of the latch device device 60.

A further objective of this invention is to provide for periodic adjustment of the keeper bar 64 from time to time as needed to maintain the indicated alignment of the keeper bead 196 with latch bar seat 170 for cooperating alignment of their respective axial centers in the latched position of device 60. Sealing strips such as those indicated at 74 and 84 in FIG. 3 tend to develop a "set" with the passage of time, which will require tightening of the fasteners 82 to maintain the sealing action about the edge of the window opening 16 insofar as the sash subframe is concerned, with the resulting need to reposition the latch bar 64 inwardly of the window as required to restore the proper positioning of the keeper bead 196 relative to latch bar seat 170 that has been indicated. For this purpose screws 214 and 216 may be loosened as needed, with the latch bar 62 swung to the release position, and set screws 220 turned inwardly of keeper bar portion 200 to effect resetting of the keeper bar as needed to obtain the indicated fit of bead 196 within seat 170, with screws 214 and 216 then being tightened to fix in place the keeper bar 64, as returned to its desired operating relation relative to the latch and release bar 62.

A further function of the latch and release bar 62 is to mask the keeper bar 64 and associated parts as well as the sash subframe section 46. Latch and release bar 62 also serves to accommodate warm air distribution along the length of the sash assembly 52.

The vehicle side wall 10 conventionally is equipped with a warm air distribution system, which may comprise metal sheeting 230 or the like shaped, for instance, in consecutive alternating hat shaped channel configuration diagrammatically illustrated in FIG. 5 so as to define adjacent warm air riser ducts 232 along the length of the vehicle wall 10 that communicate between a source of heat at the floor level and a warm air pooling area 234 between the trim strip 38 and the vehicle side wall 10 under the latch and release bar 62 in the case of the sash assembly 52, and under the trim pieces 28 and 30 in the case of the fixed window assemblies 20 and 22. The latch and release bar 62 across its base flange 140 is formed with a row of apertures 236 to accommodate the flow of warm air in the direction of the arrows from the pooling area 234 through the latch and release bar base flange 140 so that the warm air may pass upwardly across the height of the sash assembly 52. The fixed trim pieces 28 and 30 are formed with similar apertures 238 for similar purposes.

The latch and release bar 62, it will be observed, provides the user in opening latch device 60 with a second class lever arrangement with a relatively long lever, extending from hinge axis 156 to edge portion 162 of bar 62 for effecting quick release of bar 62 from the keeper bead 196. The shaping of latch bar 62 to accommodate the indicated warm air flow and to project downwardly well below the upper edging 233 of trim member 38, in the latched position of latch 60, isolates the user's hands, when deployed to open latch 60, well away from the keeper bar 64 and its operative parts which provides an important safety factor for the person opening latch device 60. Rib 144 in masking the latching socket 170 and bead 196 provides an additional safety factor.

As to the operation of the latch device 60, FIGS. 2, 3 and 7 show its components in the sash assembly latched relation. This position is achieved, assuming that the sash assembly 52 has been opened, by grasping the handle framing edge portion 162 of the latch and release bar 62 and drawing the sash assembly 52 to its closed position, to the point that the depending rib 144 has moved substantially inwardly of the keeper bar bead 196. The latch and release bar 62 is swung downwardly about hinge axis 156, and pulled inwardly of the vehicle, as needed to bring the rib camming surface 178 into camming relation with the keeper bead 196, and with the latch release bar 62 then being pressed downwardly, as by hand pressure on top of its base flange 140, the snap action corner 176 is cammed downwardly over the cylindrical surfacing 197 of the keeper bar bead 196, until the snap action corner 176 rides by and moves "over center" of that portion of the bead surfacing 197 which is opposed 180 degrees from the hinging axis 156, which position on the surfacing 197 lies on a plane containing the hinging axis 156 and the bead axis 198, and is indicated at 235 in FIG. 7. The resilient compression of the sash assembly seals that occurs by the camming action of the snap action corner 176 inwardly across the bead surfacing 197 creates a substantial bias on the latch and release bar 62 inwardly of the window, by way of the securement of the latch and release bar 62 to the sash assembly through its hinged connections 66, which, when the snap action corner 176 is passed the bead surface location 240 (see FIG. 7), snap seats the keeper bead 196 into the latch bar seat 170, and holds the latch device 60 in its latched relation.

As will be observed from the specific showing of FIG. 7, the aligned central axes of bead 198 and seat 170, in the latch position of the latching device 60, are below the level of the hinging axis 156. Axes 171 and 198 being aligned, are, of course, spaced an equal distance from hinging axis 156. The thrust flange 194 of the keeper bar 64 is at an angle of approximately 30 degrees with respect to the keeper bar base flange 140, and the keeper bar bead 196 as seated in the latch and release bar seat 170 disposes the latch bar snap action corner 176 well below the aligned axes 171 and 198 and adjacent the lower level of the bead cylindrical surfacing 197.

This organization of parts positions the latch device 60 to resist substantial thrust loads applied to the sash assembly 52 tending to move it outwardly of the vehicle window, in opposition to the holding action of the latch device 60.

However, when it becomes desirable or necessary to open the sash assembly 52, the latch and release bar 62 is easily raised by the passenger lightly lifting upwardly on the handle portion 162 of the latch and release bar 62 depending flange 160, which acts thrugh the relatively long lever arm extending from the hinge axis 156 to cam snap action corner 176 upwardly of the keeper bead surfacing 97 and past the snapping point 235 surfacing of same so that the built in compression of the sash assembly seals starts swinging of the sash assembly 52 to the open direction, with the keeper bead 196 camming the latch and release bar further upwardly by engagement with the cam surface 148, as needed, under the indicated biasing force provided by the sash assembly seals. The passenger completes the opening of the sash assembly 52 by lifting the latch and release bar to clear the keeper bar and swinging the sash assembly 52 outwardly as needed.

When the sash assembly is to be closed, the sash assembly is returned to its closed position and latch and release bar 62 swung downwardly back to its latch position of FIG. 2 as aforedescribed.

It will be observed from the showing of FIGS. 2, 3 and 7 that the lever arm that the operator of the latch and release bar 62 operates through in grasping hand grip portion 162, about hinging axis 156 as a center is approximately twice the distance between hinging axis 156 and bead axis 198. This relatively long lever arm and the second degree lever system provided makes for minimal effort requirement to both open and close latch device 60.

It will therefore bee seen that the invention provides an openable sash assembly and quick opening release latching arrangement therefor which is arranged to firmly hold the sash assembly in latch position against substantial forces acting on the sash assembly outwardly of the window, as applied to the sash assembly itself. The latch device 60 will remain latched until the latch and release bar is deliberately swung upwardly to snap the latch bar snapping corner past the keeper bead. However, this lifting action requires only a small amount of actuation force by the operator due to the long lever arm the latch and release arm acts through in being swung to free it from the keeper latching bead. Closing the latch device is quick and easy for similar reasons, and once closed, the latch device is held closed by a biased over center relationship of parts.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

We claim:

1. In a window construction including a window frame mounted in a vertical wall and forming a generally quadrilateral window opening in the wall defining upper and lower generally horizontal window opening edges, and a sash frame assembly of a size to close the window opening when aligned with and disposed in same and including a sash frame proportioned to complement the window opening and transparent panel means mounted in the sash frame for closing the window opening when the sash frame assebmly is in its closed position, said sash frame including a first sash rail portion pivoted to said window frame for swinging movement of the sash frame assembly outwardly of the window opening to open the window opening, said sash frame including a lower rail portion formed to seal off the window opening at the window opening lower edge, and a latch assembly for releasably latching the sash frame lower rail portion to the window frame for holding the sash frame assembly in its closed position, the improvement wherein said latch assembly comprises:
an elongate latch bar of generally right angled transverse cross-sectional configuration along the length thereof defining a base flange portion forming one side of said bar and having a generally planar web defining a depending rib extending the length of said bar along a median portion of said base flange portion and a planar terminal edge portion coplanar with said base flange portion and spaced from one side of said rib,
means for hinging said base flange edge portion to the sash assembly lower rail portion for pivotal movement about a horizontal axis disposed at the level of the sash assembly lower rail portion,
said bar configuration defining a depending flange portion on the other side of said rib and spaced therefrom,
said latch assembly further comprising an elongate keeper member secured to the window frame along the lower edge of same,
said keeper member comprising:
a keeper bar having a base flange forming one side of the keeper bar and underlying said latch bar base flange portion in the latched position of the latch assembly,
said keeper bar base flange portion having integral therewith a keeper thrust flange portion along its outer side edge that is angled upwardly and inwardly of the window opening an acute angle surmounted with a horizontal rectilinear bead of cylindrical configuration defining a central axis that is below the level of and is spaced inwardly of said hinging means axis in said latched position of the latch assembly,
said bead exceeding semi-cylindrical shaping in circumference,
said bead axis being spaced inwardly of the window opening a predetermined distance from said hinging means axis in said latched position of the latch assembly,
said latch bar base flange along said one side of said rib defining a concave latching seat of cylindrical configuration struck about an axis that is at said predetermined distance from said hinging means axis in said latched position of the latch assembly,
said latch bar seat being tangent with the underside of said latch bar terminal edge portion along one edge of same and defining with said rib one side an external snap action rectilinear corner that is spaced from said hinging means axis, in said lateral position of the latch assembly, a distance that exceeds said predetermined distance but is less than said predetermined distance plus the radius of said bead,
said latch bar seat having a circumference that is on the order of one hundred degrees in circumference,
said rib side downwardly of said snap action corner defining a cam surface that downwardly of said latch bar base flange portion converges toward the plane of said latch bar depending flange portion,
said keeper bar bead axis being elevational positioned relative to said hinging means axis such that said latch bar base flange portion is horizontally disposed and said latch bar depending flange portion is vertically disposed when said keeper bar bead is seated in said latch bar seat,
said latch bar depending flange portion extending below the level of said seat axis a distance that exceeds said predetermined distance, and provides a lever for upwardly swinging of said latch bar about said hinge means axis that is on the order of twice said predetermined distance.

2. The improvement set forth in claim 1 including:
means below the level of the latch bar base flange for shielding said bead and said seat from the operator's hand digits grasping the latch bar depending flange portion to open said latch assembly.

3. The improvement set forth in claim 1 wherein:
said means for hinging said latch bar base flange edge portion to the sash assembly lower rail comprises:
one or more hinge assemblies each comprising:
a first hinge leaf fixed to said latch bar base flange in coplanar relation thereto,
a second hinge leaf anchored in the sash assembly lower rail,
and pintle means hinging said leaves together to define said hinging axis.

4. The improvement set forth in claim 3 wherein:
the sash assembly lower rail is slotted to receive said second hinge leaf, and including fastner means for anchoring the second hinge leaf to the sash assembly lower rail from the underside of same, said hinge leaves being planar in configuration and being horizontally disposed when said keeper bar bead is seated in said latch bar seat, whereby said second hinge leaf is substantially masked within the sash assembly lower rail.

5. The improvement set forth in claim 1 wherein:

said keeper bar is of right angled transverse cross-sectional configuration and having in addition to said base flange, a depending flange portion disposed inwardly of and extending away from said bead, said keeper bar base flange extending beyond said keeper flange portion at either end of said keeper bar to define opposed keeper bar end portions, and including:

releasable fastener means for releasably securing said keeper bar end portions to the window frame, and adjustably mounted threaded means carried by said keeper bar depending flange for horizontally adjusting said bead relative to the window frame.

6. The improvement set forth in claim 5 wherein:

said latch bar base flange portion parallels said keeper bar base flange portion, and said latch bar depending flange portion parallels said keeper bar depending flange portion, when said bead is received in said seat.

7. The improvement set forth in claim 1 wherein the lower edge of the window opening is defined by a sash subframe forming a part of the window frame, said sash subframe comprising:

an outer trim member and an inner trim member both extending longitudinally of the window opening lower edge, a resiliently compressible separator member interposed between said trim members, said trim member each including a depending gripping flange extending longitudinally thereof, with said gripping flanges being in opposed relation, and means for making said inner trim member fast to said outer trim member to compress said separator member and clamp said gripping flanges against the wall, said inner trim member having an upwardly facing horizontally disposed mounting surface, said keeper bar being mounted on said inner trim member surface, and means for adjusting said keeper bar relative to said inner trim member to reposition said bead axis to said predetermined distance from said hinging means axis to compensate for tendencies of said separator member to take a set.

8. The improvement set forth in claim 7 wherein:

said keeper bar is of right angled transverse cross-sectional configuration and having in addition to said base flange, a depending flange portion disposed inwardly of and opposing said inner trim member, said keeper bar base flange extending beyond said keeper flange portion at either end of said keeper bar to define opposed keeper bar end portions, and including:

releasable fastener means for releasably securing said latch bar end portions to said inner trim member on said mounting surface, and adjustably mounted threaded means carried by said keeper bar depending flange for horizontally adjusting said bead relative to said inner trim member.

9. The improvement set forth in claim 8 wherein:

said latch bar base flange portion parallels said keeper bar base flange portion, and said latch bar depending flange portion parallels said keeper bar depending flange portion, when said bead is received in said seat.

10. The improvement set forth in claim 7 wherein the vertical wall below the window frame on the inside of the wall is formed with vertical ducting leading from a source of heat below the window frame, the further improvement wherein:

said latch bar depending flange portion masking said keeper member and inner trim member and extending below said inner trim member gripping flange, said latch bar depending flange portion being spaced inwardly of the wall to define a pooling area for heated air rising from said ducting, said latch bar base flange inwardly of said rib being apertured therealong for directing heated air from below said latch bar base flange along the inside of the sash frame assembly.

* * * * *